United States Patent
Zarringhalam et al.

(12) 
(10) Patent No.: US 11,794,751 B2
(45) Date of Patent: Oct. 24, 2023

(54) PRO-ACTIVE TRAJECTORY TRACKING CONTROL FOR AUTOMATED DRIVING DURING ELEVATION TRANSITIONS

(71) Applicant: GM GLOBAL TECHNOLOGY OPERATIONS LLC, Detroit, MI (US)

(72) Inventors: Reza Zarringhalam, Whitby (CA); Yongkyun Shin, Thornhill (CA); Mohammadali Shahriari, Markham (CA); Avshalom Suissa, Ganei Tikva (IL); Kevin A. O'Dea, Ann Arbor, MI (US); Amir Takhmar, Toronto (CA); Mohammed Raju Hossain, Oshawa (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 56 days.

(21) Appl. No.: 17/186,649

(22) Filed: Feb. 26, 2021

(65) Prior Publication Data
US 2022/0274602 A1 Sep. 1, 2022

(51) Int. Cl.
*B60W 40/076* (2012.01)
*B60W 50/00* (2006.01)
*B60W 40/072* (2012.01)

(52) U.S. Cl.
CPC ........ *B60W 40/076* (2013.01); *B60W 40/072* (2013.01); *B60W 50/0097* (2013.01); *B60W 2420/42* (2013.01); *B60W 2552/15* (2020.02); *B60W 2556/40* (2020.02)

(58) Field of Classification Search
CPC .................................... B60W 40/076
See application file for complete search history.

(56) References Cited

U.S. PATENT DOCUMENTS

| | | | | |
|---|---|---|---|---|
| 2017/0233001 A1* | 8/2017 | Moshchuk | ........... | G05D 1/021 701/42 |
| 2018/0057003 A1* | 3/2018 | Hyun | ............... | B60W 40/06 |
| 2018/0164827 A1* | 6/2018 | Chu | ................ | G05D 1/0217 |
| 2018/0330173 A1* | 11/2018 | Zhu | .............. | B60W 10/184 |
| 2021/0155251 A1* | 5/2021 | Arat | ............. | B60W 40/068 |
| 2022/0402476 A1* | 12/2022 | Engel | ............ | B60W 50/0097 |

* cited by examiner

*Primary Examiner* — Imran K Mustafa
(74) *Attorney, Agent, or Firm* — Lorenz and Kopf LLP

(57) ABSTRACT

In exemplary embodiments, methods, systems, and vehicles are provided that include: one or more sensors disposed onboard a vehicle and configured to at least facilitate obtaining sensor data for the vehicle; one or more location systems configured to at least facilitate obtaining location data pertaining to a location of the vehicle; a computer memory configured to store map data pertaining to a path corresponding to the location; and a processor disposed onboard the vehicle and configured to at least facilitate: generating an elevation profile along the path using the sensor data and the map data; and providing instructions for controlling the vehicle using the elevation profile.

20 Claims, 6 Drawing Sheets

PRO-ACTIVE TRAJECTORY TRACKING CONTROL FOR AUTOMATED DRIVING DURING ELEVATION TRANSITIONS

INTRODUCTION

The technical field generally relates to vehicles and, more specifically, to methods and systems for controlling vehicles during road elevation transitions.

Certain vehicles today include systems for controlling the vehicle based on estimating a road bank and grade angles for a roadway on which the vehicle is traveling. However, such existing vehicle systems generally include a single point estimate for the vehicle at a particle point in time and position in which the vehicle is located, and such existing vehicle systems may not provide optimal estimates in certain situations which results in sub-optimal controls performance.

Accordingly, it is desirable to provide improved methods and systems for controlling vehicles during road elevation transitions.

SUMMARY

In accordance with an exemplary embodiment, a method is provided that includes: obtaining sensor data from one or more sensors onboard a vehicle; obtaining location data pertaining to a location of the vehicle; obtaining map data pertaining to a path corresponding to the location; generating, using a processor, an elevation profile along the path using the sensor data and the map data; and proactively controlling the vehicle, based on instructions provided by the processor, using the predicted elevation profile.

Also in an exemplary embodiment, the method further includes: receiving user inputs as to a destination of travel for the vehicle; and generating a planned mission for travel to the destination along a roadway associated with the path, based on the user inputs and the location data; wherein the step of generating the elevation profile includes generating a road elevation profile over a receding prediction horizon for the roadway in accordance with the planned mission, via the processor, using the sensor data and the map data; and wherein the step of controlling the vehicle includes controlling the vehicle, based on the instructions provided by the processor, using the predictive road elevation profile over the receding prediction horizon.

Also in an exemplary embodiment, the road elevation profile includes a profile of bank angles and grade angles for the roadway along with the receding prediction horizon.

Also in an exemplary embodiment, the road elevation profile is generated by the processor based on camera data as well as lane level map data for the roadway.

Also in an exemplary embodiment, the method further includes performing, via the processor, a transformation of the elevation profile from road coordinates to vehicle coordinates, generating a transformed elevation profile.

Also in an exemplary embodiment, the step of controlling the vehicle includes controlling lateral dynamics of the vehicle, via instructions provided by the processor, based on the transformed elevation profile.

Also in an exemplary embodiment, the step of controlling the vehicle includes controlling longitudinal dynamics of the vehicle, via instructions provided by the processor, based on the transformed elevation profile.

In another exemplary embodiment, a system is provided that includes: one or more sensors configured to at least facilitate obtaining dynamic measurements and path information for a vehicle; one or more location systems configured to at least facilitate obtaining location data pertaining to a location of the vehicle; a computer memory configured to store map data pertaining to a path corresponding to the location; and a processor configured to at least facilitate: generating an elevation profile along the path using the sensor data and the map data; and providing instructions for controlling the vehicle using the elevation profile.

Also in an exemplary embodiment, the one or more sensors are configured to at least facilitate receiving user inputs as to a destination of travel for the vehicle; and the processor is configured to at least facilitate: generating a planned mission for travel to the destination along a roadway associated with the path, based on the user inputs and the location data; generating a road elevation profile over a receding prediction horizon for the roadway in accordance with the planned mission using the sensor data and the map data; and providing instructions for control of the vehicle using the road elevation profile over the receding prediction horizon.

Also in an exemplary embodiment, the road elevation profile includes a profile of bank angles and grade angles for the roadway along with the receding prediction horizon.

Also in an exemplary embodiment, the processor is configured to at least facilitate generating the road elevation profile based on camera data as well as lane level map data for the roadway.

Also in an exemplary embodiment, wherein the processor is configured to at least facilitate performing a transformation of the elevation profile from road coordinates to vehicle coordinates, generating a transformed elevation profile.

Also in an exemplary embodiment, the processor is further configured to at least facilitate controlling lateral movement of the vehicle based on the transformed elevation profile.

Also in an exemplary embodiment, the processor is further configured to at least facilitate controlling longitudinal movement of the vehicle based on the transformed elevation profile.

In another exemplary embodiment, a vehicle is provided that includes: a body; a propulsion system configured to generate movement of the body; one or more sensors disposed onboard the vehicle and configured to at least facilitate obtaining sensor data for the vehicle; one or more location systems configured to at least facilitate obtaining location data pertaining to a location of the vehicle; a computer memory configured to store map data pertaining to a path corresponding to the location; and a processor disposed onboard the vehicle and configured to at least facilitate: generating an elevation profile along the path using the sensor data and the map data; and providing instructions for controlling the vehicle using the elevation profile.

Also in an exemplary embodiment, the one or more sensors are configured to at least facilitate receiving user inputs as to a destination of travel for the vehicle; and the processor is configured to at least facilitate: generating a planned mission for travel to the destination along a roadway associated with the path, based on the user inputs and the location data; generating a road elevation profile over a receding prediction horizon for the roadway in accordance with the planned mission using the sensor data and the map data; and providing instructions for control of the vehicle using the road elevation profile over the receding prediction horizon.

Also in an exemplary embodiment, the road elevation profile includes a profile of bank angles and grade angles for the roadway along with the receding prediction horizon.

Also in an exemplary embodiment, the processor is configured to at least facilitate generating the road elevation profile based on camera data as well as lane level map data for the roadway.

Also in an exemplary embodiment, the processor is configured to at least facilitate performing a transformation of the elevation profile from road coordinates to vehicle coordinates, generating a transformed elevation profile.

Also in an exemplary embodiment, the processor is further configured to at least facilitate controlling lateral movement and longitudinal movement of the vehicle based on the transformed elevation profile.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
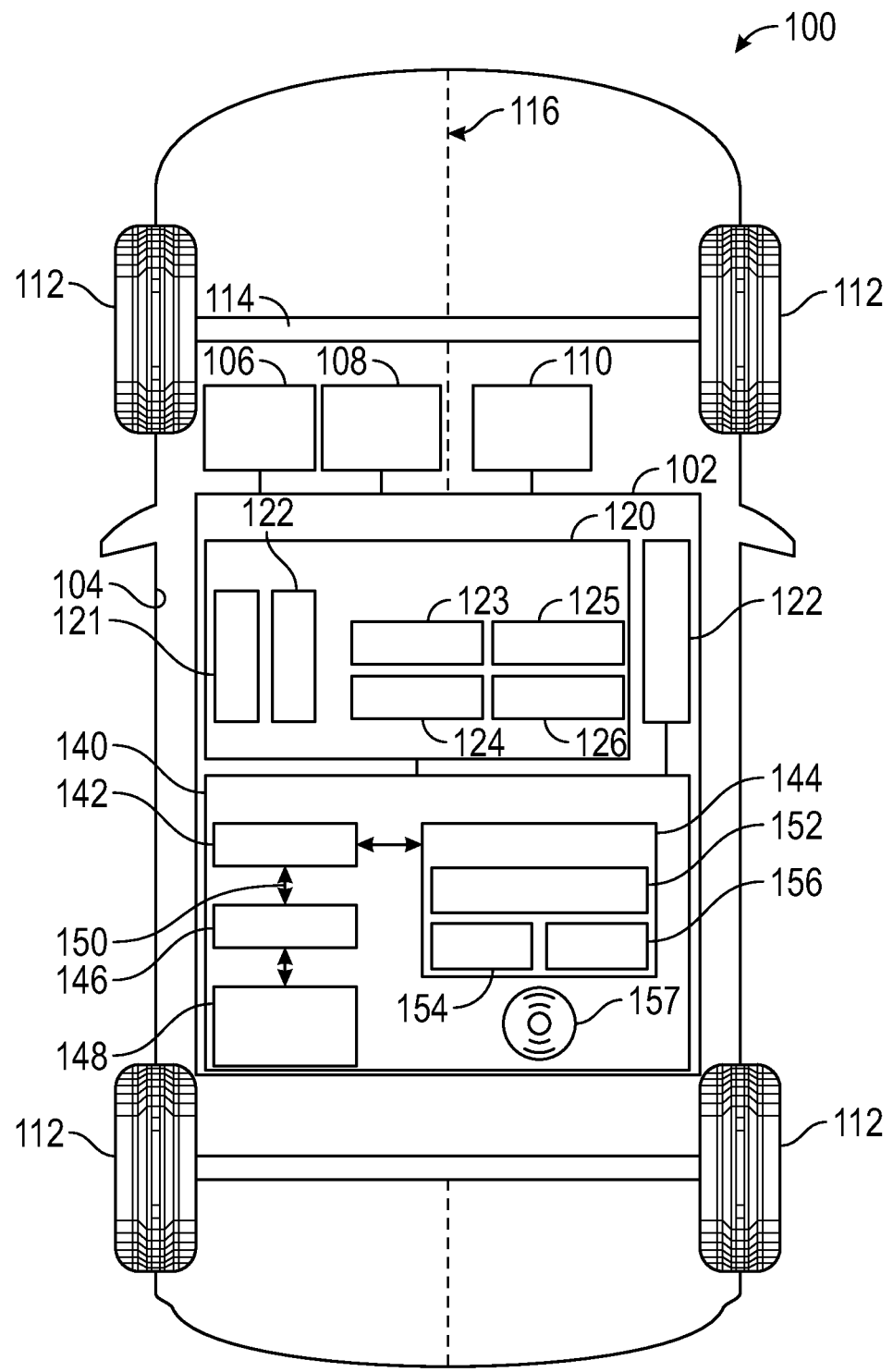
FIG. 1 is a functional block diagram of a vehicle that includes a control system for controlling a vehicle with respect to road elevation transitions, in accordance with exemplary embodiments.

FIG. 1 illustrates a vehicle 100, according to an exemplary embodiment. As described in greater detail further below, the vehicle 100 includes a control system 102 for controlling the vehicle 100 with respect to road elevation transitions utilizing proactive model control with a predictive time horizon using sensor, location, and map data, in accordance with an exemplary embodiment.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 112 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102.

In the embodiment depicted in FIG. 1, the control system 102 is coupled to the braking system 106, the steering system 108, and the drive system 110. Also as depicted in FIG. 1, in various embodiments, the control system 102 includes a sensor array 120, location system 130, and a controller 140.

In various embodiments, the sensor array 120 includes various sensors that obtain sensor data for use in tracking road elevation and controlling the vehicle 10 based on the road elevation. In the depicted embodiment, the sensor array 120 includes inertial measurement sensors 121, input sensors 122 (e.g., brake pedal sensors measuring brake inputs provided by a driver and/or touch screen sensors and/or other input sensors configured to received inputs from a driver or other user of the vehicle 10); steering sensors 123 (e.g., coupled to a steering wheel and/or wheels of the vehicle 10 and configured to measure a steering angle thereof), torque sensors 124 (e.g., configured to measure a torque of the vehicle), speed sensors 125 (e.g., wheel speed sensors and/or other sensors configured to measure a speed and/or velocity of the vehicle and/or data used to calculate such speed and/or velocity), cameras 126 (e.g., configured to obtain camera images of a roadway in which the vehicle is travelling).

Also in various embodiments, the location system 130 is configured to obtain and/or generate data as to a position and/or location in which the vehicle is located and/or is travelling. In certain embodiments, the location system 130 comprises and/or or is coupled to a satellite-based network and/or system, such as a global positioning system (GPS) and/or other satellite-based system.

In various embodiments, the controller 140 is coupled to the sensor array 120 and the location system 130. Also in various embodiments, the controller 140 comprises a computer system (also referred to herein as computer system 14), and includes a processor 142, a memory 144, an interface 146, a storage device 148, and a computer bus 150. In various embodiments, the controller (or computer system) 140 controls vehicle operation based on the road grade and bank, and during road elevation transitions. In various embodiments, the controller 140 provides these and other functions in accordance with the steps of the process of FIG. 3 and the implementations of FIGS. 4-9.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 300 discussed further below in connection with FIG. 3, the implementations of FIGS. 4-9.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 154 (e.g., from and/or used in connection with the location system 130) and one or more stored values 156 (e.g., including, in various embodiments, road elevation data from upcoming road segments and/or other roadways and/or thresholds for making determinations and/or exercising vehicle control based on the road grade and/or bank).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the location system 130. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 300 discussed further below in connection with FIG. 3, the implementations of FIGS. 4-9. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
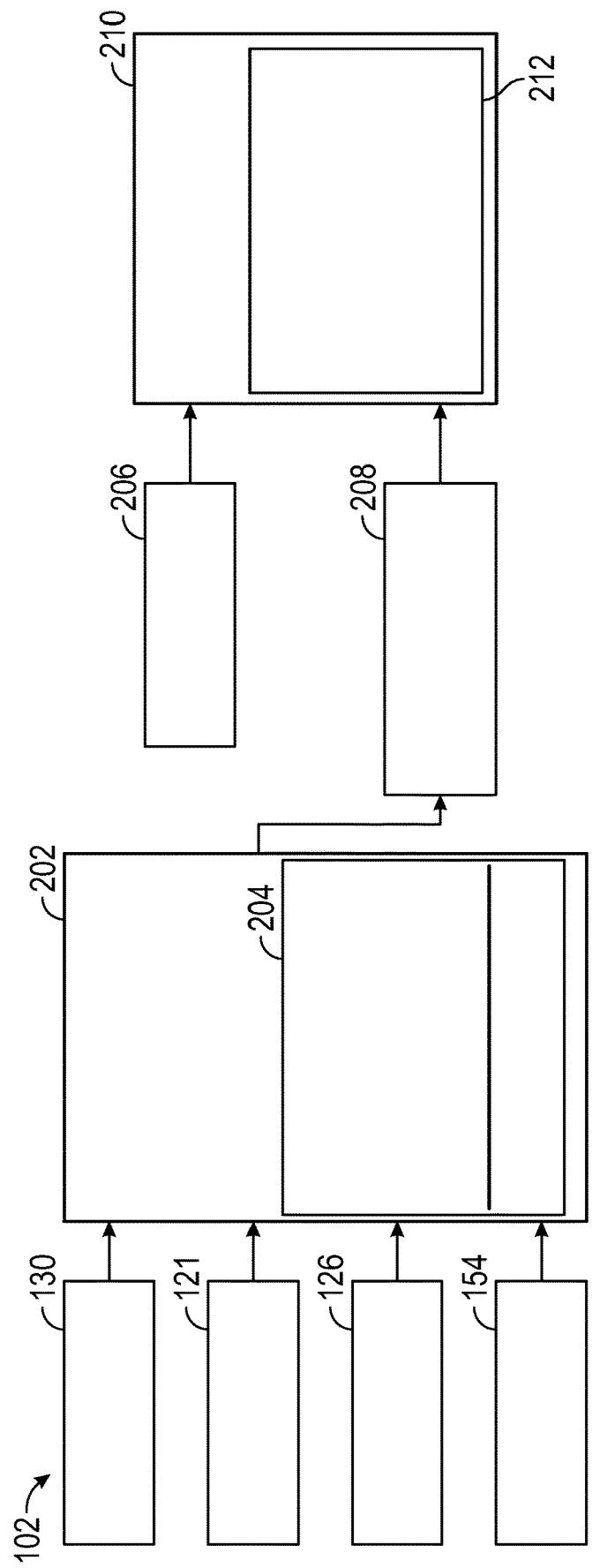
FIG. 2 is a block diagram of modules of the control system of FIG. 1, in accordance with exemplary embodiments.

FIG. 2 provides a functional block diagram for modules of the control system 102 of FIG. 1, in accordance with exemplary embodiments. As depicted in FIG. 2, in various embodiments, the control system 102 includes the location system 130 (e.g., GPS) of FIG. 1, inertial measurement sensors 121 and cameras 126 of FIG. 1, and map data 154 of FIG. 1 (e.g., stored in the memory 144 of FIG. 1).

As depicted in FIG. 1, in various embodiments, the data from the location system 130 (e.g., GPS), inertial measurement sensors 121, cameras 126, and map data 154 (and, in various embodiments, additional data, such as from additional sensors of the sensor array 120 of FIG. 1) are provided as inputs into an algorithm 202 for predicting a maneuver and transition for the vehicle at various points in time ($t_k$, $t_{k+1}, \ldots, t_{k+p}$).

Also in various embodiments, the algorithm 202 utilizes a Bayesian filter, in accordance with the following equation:

$$p(x_k | z_{1:k}) = \frac{p(z_k | x_1) p(x_k | z_{1:k-1})}{p(z_k | z_{1:k-1})},$$ (Equation 1)

in which $p(x_k|z_{1:k})$ is the probability distribution of the state update based on the predicted state and measurements likelihood calculated based on Bayes estimator. Other estimation algorithms can be used for this purpose too.

Also in various embodiments, the algorithm 202 is executed via the processor 142 of FIG. 1, and generates a predicted disturbance 208 at the various points in time, in accordance with the following equations:

$$\phi_k \; \phi_{k+1} \; \phi_{k+2} \; \ldots \; \phi_{k+p},$$ (Equation 2)

$$\dot{\psi}_{des_k} \; \dot{\psi}_{des_{k+1}} \; \dot{\psi}_{des_{k+2}} \; \ldots \; \dot{\psi}_{des_{k+p}},$$ (Equation 3)

$$\theta_k \; \theta_{k+1} \; \theta_{k+2} \; \ldots \; \theta_{k+p}, \text{ and}$$ (Equation 4)

$$a_{x_{ref_k}} \; a_{x_{ref_{k+1}}} \; a_{x_{ref_{k+2}}} \; \ldots \; a_{x_{ref_{k+p}}},$$ (Equation 5)

in which $\phi_k$ represents the road bank angle, $\theta_k$ represents the road grade angle, $\dot{\psi}_k$ represents the desired yaw rate for the vehicle, and $$a_{x_{ref_k}}$$

is the desired longitudinal acceleration.

Also in various embodiments, a tracking error ($e_k$) 206 is generated via the processor 144 of FIG. 1. Tracking error is the difference between the desired vehicle trajectory and the vehicle trajectory.

As depicted in various embodiments, the predicted disturbance 208 and the tracking error 206 are provided for model predictive control (MPC) for control of the vehicle 10 in a manner that compensates for the road elevation disturbance over the prediction. In various embodiments, the processor 144 of FIG. 1 provides instructions for the model predictive control using adaptive proactive control 212 for the vehicle (e.g., by providing instructions for adjusting acceleration, braking, and/or steering for the vehicle 10) along the receding horizon at various time points ($t_k, t_{k+1}, \ldots, t_{k+p}$).

Figure 3:
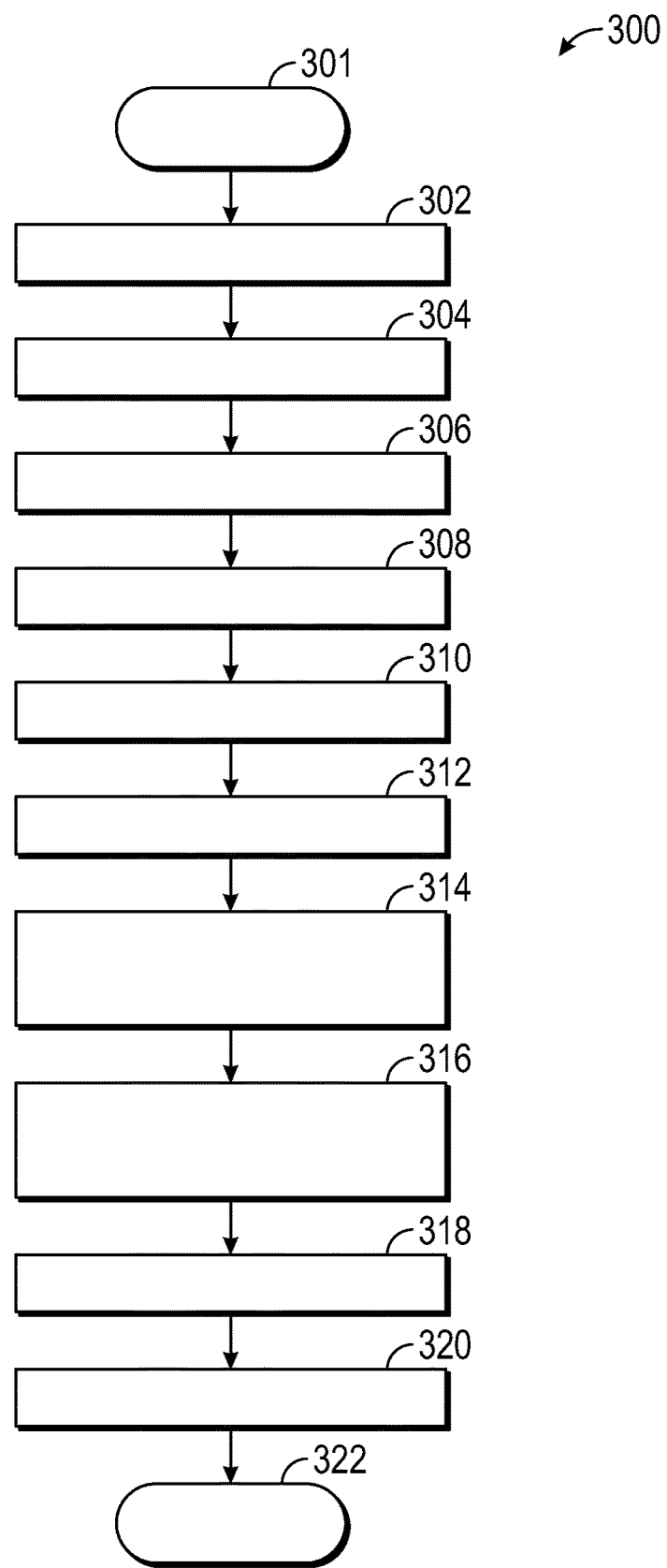
FIG. 3 is a flowchart of a process for controlling a vehicle with respect to road elevation transitions, and that can be implemented in connection with the vehicle of FIG. 1 and the control system of FIGS. 1 and 2, in accordance with exemplary embodiments.

FIG. 3 is a flowchart of a process 300 for controlling a vehicle with respect to road elevation transitions, in accordance with exemplary embodiments. In various embodiments, the process 300 can be implemented in connection with the vehicle 100 of FIG. 1 and the control system 102 of FIGS. 1 and 2. The process 300 of FIG. 3 will also be discussed further below in connection and FIGS. 4-9, which show different implementations of the process 300 in accordance with various embodiments.

As depicted in FIG. 3, the process begins at step 301. In one embodiment, the process 300 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In one embodiment, the steps of the process 300 are performed continuously during operation of the vehicle.

User inputs are generated for the vehicle (step 302). In various embodiments, the user inputs are obtained from a driver or other user of the vehicle 100 via inputs sensors 122 of FIG. 1. In various embodiments, the user inputs include a destination of travel for the vehicle 100 for the current vehicle drive. In addition, in certain embodiments, the user inputs may also include one or more other user requests pertaining to the vehicle drive, such as a preference as to a route or type of route for the vehicle drive, an override of one or more automated features of the vehicle 100, and so on. In certain embodiments, the user inputs are inputted by the driver or other user of the vehicle 100 via one or more buttons, switches, knobs, touch screens, microphones, and/or other devices of the vehicle 100, for example as part of the location system 130 of FIG. 1 (e.g., in certain embodiments, as part of a navigation system and/or GPS system, or the like). In various embodiments, the user inputs of step 302 is provided to the processor 142 of FIG. 1 for processing, and for making determinations and implementation the remaining steps of the process 300, for example as described below.

Also in certain embodiments, additional sensor data is obtained (step 304). In various embodiments, sensor data is obtained with respect to the vehicle 100 and/or a roadway or path on which the vehicle 100 is travelling, via one or more inertial measurement sensors 121, steering sensors 123, torque sensors 124, speed sensors 125, cameras 126, and/or other sensors of the sensor array 120 of FIG. 1. In various embodiments, the sensor data of step 304 is provided to the processor 142 of FIG. 1 for processing, and for making determinations and implementation the remaining steps of the process 300, for example as described below.

Location data is obtained for the vehicle (step 306). In various embodiments, location data is obtained via the location system 130 of FIG. 1 (e.g., a GPS system) pertaining to a location of the vehicle 100. In certain embodiments, such location information is obtained using information from one or more satellites, and includes longitudinal and latitudinal coordinates for the vehicle 100. In various embodiments, the location data of step 306 is provided to the processor 142 of FIG. 1 for processing, and for making determinations and implementation the remaining steps of the process 300, for example as described below.

Map data is also obtained for the vehicle drive (step 308). In various embodiments, lane level map data is obtained for the roadway or path on which the vehicle 100 is travelling. In various embodiments, the map data is retrieved from one or more map data 154 stored in the memory 144 of FIG. 1 corresponding to the lane and roadway or path on which the vehicle 100 is travelling, based on the location data of step 306.

Camera data is obtained (step 310). In various embodiments, camera data is obtained for the roadway or path on which the vehicle 100 is travelling, and includes information as to the road grade and bank angles of the roadway. In various embodiments, the camera data is obtained with respect to a current lane in which the vehicle 100 is travelling. In certain embodiments, the camera data is also obtained with respect to adjacent and/or other nearby lanes. In certain embodiments, the camera data, including information as to the road grade and bank angles, is obtained from the map data of step 308 as well as camera images obtained from the sensor data of step 304 in current and prior iterations of the process 300.

A mission is planned for the vehicle (step 312). In various embodiments, a mission (or path of travel) for the vehicle 100 is planned in order to reach the destination of the current vehicle drive in accordance with the user inputs of step 302. In various embodiments, the mission is determined by the processor 142 of FIG. 1 to include the roadway(s) and lane(s) of travel within the roadway(s) in order to reach the destination as selected by the user. In certain embodiments, the location data of step 306, the map data of step 308, and/or the camera data of step 310 are also utilized by the processor 142 is selecting the mission.

In addition, in various embodiments, a bank profile is generated (step 314). In various embodiments, the bank profile is generated by the processor 142 of FIG. 1 with respect to the road and bank angles of the roadway or path along a receding prediction horizon of the roadway or path associated with the mission of step 312. In various embodiments, the bank profile is generated in this manner using the map data of step 308 and the camera data of step 310.

The generation of the bank profile of step 314 is described below in connection with exemplary implementations depicted in FIGS. 4 and 5.

Figure 4:
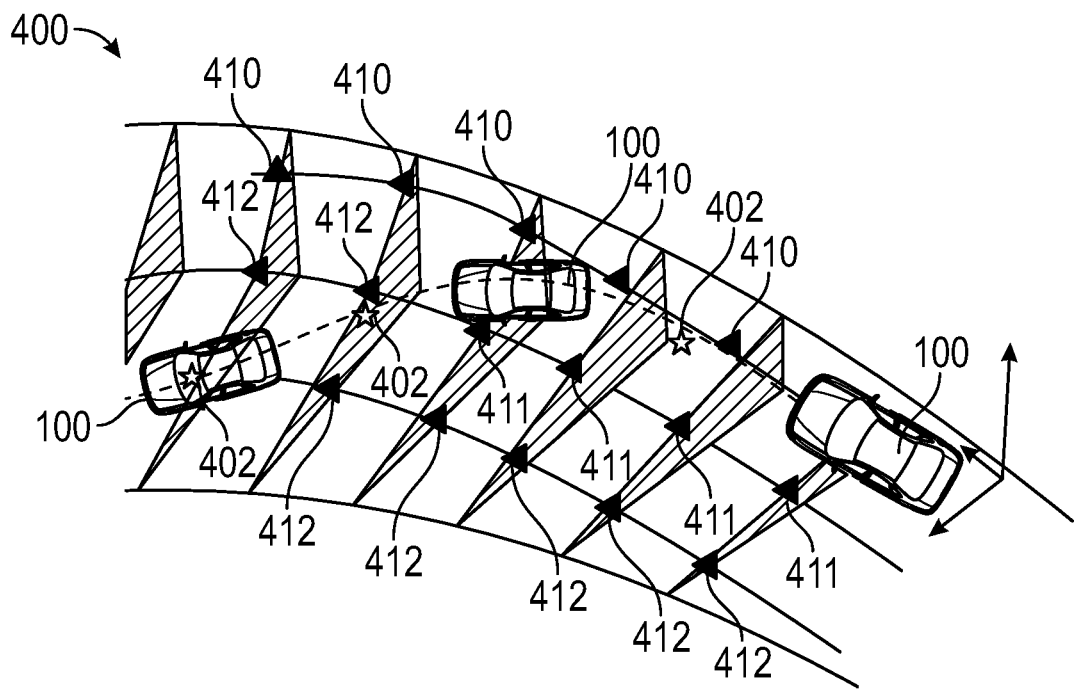
FIGS. 4-9 illustrate certain implementations of the process of FIG. 3, in accordance with exemplary embodiments.

With reference to FIG. 4, the vehicle 100 is depicted travelling along a roadway 400 having a plurality of lanes, in accordance with exemplary embodiments. In various embodiments, the vehicle 100 is travelling along a path (or mission) corresponding to points 402 designated with a star in FIG. 4 that extend across multiple lanes of the roadway 400.

Also as depicted in FIG. 4, various bank and grade angle data points are obtained at different lanes and segments along the roadway 400 (e.g., from the camera data and the map data). Specifically, in the illustrated embodiment, the bank and grade angle data points include: (i) first bank and grade angle data points 410 along a first lane of the of the roadway 400 in which the vehicle 100 is currently (or initially) travelling; (ii) second bank and grade angle data points 411 corresponding to a second lane of the roadway 400 (e.g., an immediately adjacent lane to the lane of the roadway 400 in which the vehicle 100 is currently travelling); and (iii) third bank and grade angle data points 412 along a third lane of the roadway 400 (e.g., a lane that is two lanes away from the lane in which the vehicle 100 is currently travelling). In accordance with an exemplary embodiment, FIG. 4 depicts an exemplary implementation in which the vehicle 100 is executing (or about to execute) a lane change maneuver across the three lanes of the roadway 400.

Figure 5:
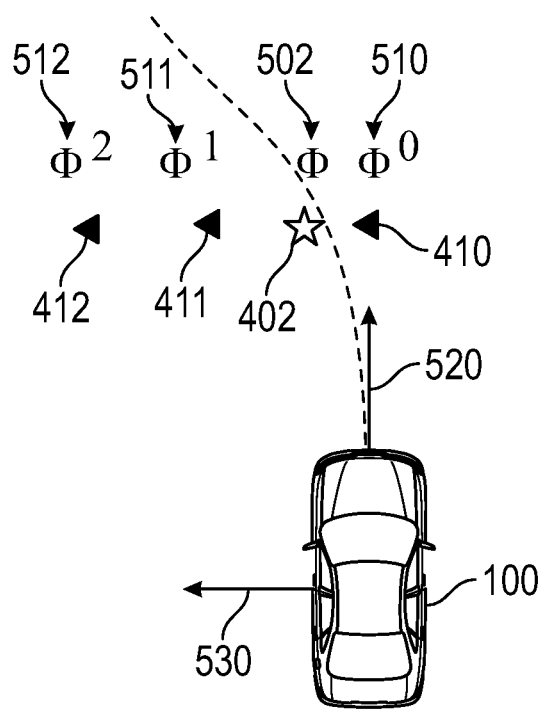

With reference to FIG. 5, this exemplary implantation of FIG. 4 is illustrated with a close up view of the vehicle 100 as positioned on the roadway 400 of FIG. 1, in accordance with an exemplary embodiment. As depicted in FIG. 5, each point of travel 402 for the vehicle 100 include an associated road bank angle $\Phi x$ 502 for the roadway 400. Also as depicted in FIG. 5, in various embodiments: (i) each of the first data points 410 include an associated road bank angle $\Phi^0 x$ 510 for the first lane of the roadway 400; (ii) each of the second data points 411 include an associated road bank angle $\Phi^1 x$ 511 for the second lane of the roadway 400; and (iii) each of the third data points 412 include an associated road bank angle $\Phi^2 x$ 512 for the third lane of the roadway 400.

Also as depicted in various embodiments, the road bank angle values are determined with respect to a coordinate system with an x-axis 520 corresponding to a current direction of travel of the vehicle 100, and a y-axis 530 that is perpendicular thereto.

In addition, in various embodiments, the road bank angle is determined in accordance with the following equations (in accordance with examples of non-limiting models that illustrate exemplary mathematical functions may be used to implement the methodology disclosed in this submission):

$$y(x) = d_1 x + d_2 x^2 + d_3 x^3 + d_4 x^4 + d_5 x^5, \quad \text{(Equation 6)}$$

$$y_i(x) = c_0 + c_1 x + c_2 x^2 + c_3 x^3, \quad \text{(Equation 7)}$$

$$\Phi_i(x) = [\Phi_0^i, \ldots, \Phi_j^i, \ldots, \Phi_p^i], \quad \text{(Equation 8)}$$

For $0 \le x_k \le x_p$, (Equation 9)

$$\operatorname{argmin}_i\left(\sqrt{(y(x_k) - y_i(x_k))^2 + (y(x_k) - y_{i+1}(x_k))^2}\right), \text{ and} \quad \text{(Equation 10)}$$

$$\Phi(x_k) = \frac{\Phi_{i+1}(x_k) - \Phi_i(x_k)}{y_{i+1}(x_k) - y_i(x_k)}(y(x_k) - y_i(x_k)) + \Phi_i(x_k), \quad \text{(Equation 11)}$$

in which $\Phi$ represents the road bank angle, and y is the lateral offset of the vehicle with respect to current position at look ahead distance x, $c_0, \ldots, c_3$ are polynomial coefficients for center of the lane for each lane i, $d_1, \ldots, d_5$ are the polynomial coefficients for the desired trajectory or planned mission profile to be determined over multiple lanes.

Also in various embodiments, similar to the example of FIG. 5, each point of travel 402 for the vehicle 100 similarly includes an associated road grade angle $\theta(x)$ 502 for the roadway 400. Also as depicted in FIG. 5, in various embodiments: (i) each of the first data points 410 also include an associated road grade angle $\theta_0(x)$ for the first lane of the roadway 400; (ii) each of the second data points 411 include an associated road grade angle $\theta_1(x)$ for the second lane of the roadway 400; and (iii) each of the third data points 412 include an associated road grade angle $\theta_2(x)$ for the third lane of the roadway 400, which are determined by the processor 142 of FIG. 1 in a similar manner as described above in connection with Equations 6-11 for the road bank angle $\phi$.

With reference back to FIG. 3, in various embodiments, the bank profile is transformed (step 316). Specifically, in various embodiments, the processor 142 of FIG. 1 transforms the road bank and angle profile of step 314 from a road coordinate system to a vehicle coordinate system. The transformation of step 316 is described below in accordance with an exemplary implementation of FIG. 6.

Figure 6:
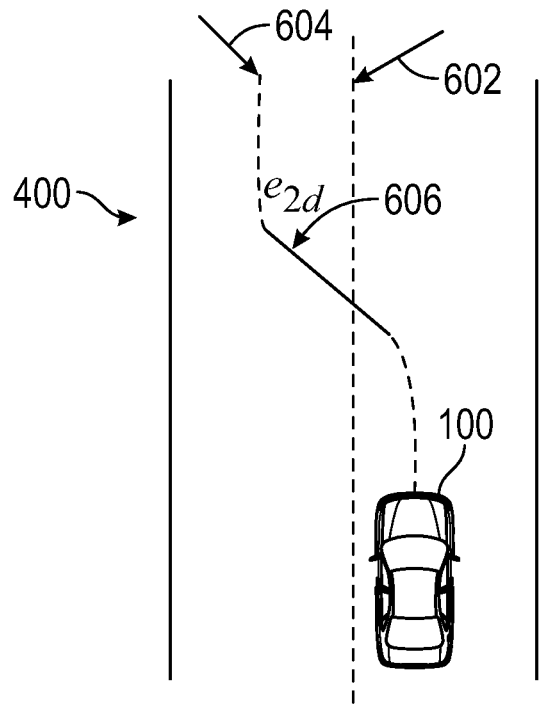

With reference to FIG. 6, the vehicle 100 is depicted on the roadway 400 having a road path 602. Also as depicted in FIG. 6, the vehicle 100 travels along a desired path 604. Also shown in FIG. 6 is a desired yaw angle $e_{2d}$ 606 for the desired path 604 relative to the road path 602, in accordance with an exemplary embodiment.

With continued reference to FIG. 6, in various embodiments, the transformation of step 316 comprises a rotation from the road coordinates (e.g., of the road path 602) to the desired path 604, in accordance with the following equations:

$$\phi = \sin(e_{2d})\Theta + \cos(e_{2d})\Phi \quad \text{(Equation 12) and}$$

$$\theta = \cos(e_{2d})\Theta - \sin(e_{2d})\Phi \quad \text{(Equation 13),}$$

in which $\Phi$ represents the road bank angle, $\Theta$ represents the road grade angle, and $e_{2d}$ represents the desired yaw angle 606 of FIG. 6 for the desired path 604 relative to the road path 602.

With reference back to FIG. 3, in various embodiments the transformed bank profile of steps 314 and 316 is utilized for controlling the vehicle, both for lateral control (step 318 and 320). In various embodiments, the transformed bank profile is utilized by the processor 142 of FIG. 1 to provide adjustments and/or control instructions to various vehicle components, such as the braking system 106, steering system 108, and/or drive system 110 to adjust lateral and longitudinal control of the vehicle 100 based on the projected bank angle and grade angle over the receding prediction horizon of the roadway, for example to offer a potentially more smooth transition as the vehicle 100 travels along different portions of the roadway having variable road bank and/or road grade angles.

Figure 7:
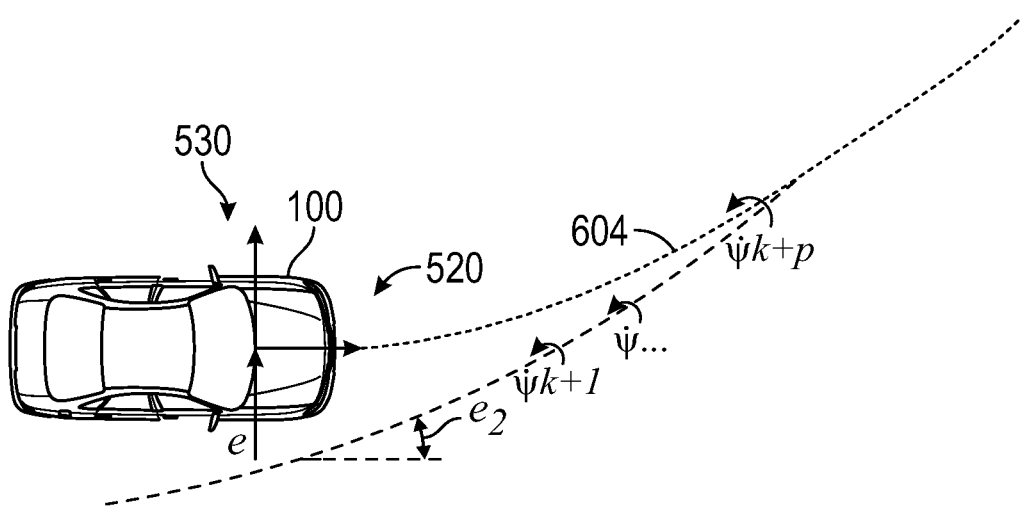
Figure 8:
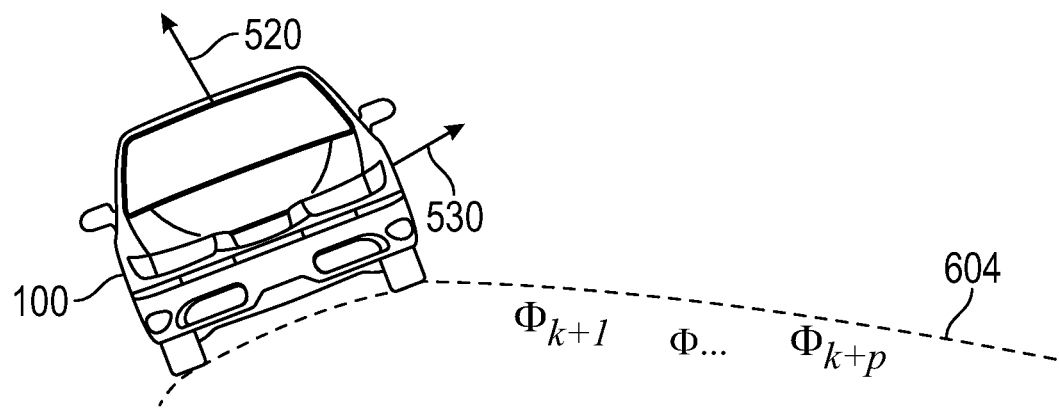

First, during step 318, in an exemplary embodiment, lateral control of the vehicle 100 is adjusted using a lateral trajectory tracking model in conjunction with the following equations:

$$\dot{e} = Ae + B_1\delta + B_2\dot{\psi}_{des} + B_3\sin(\phi), \quad \text{(Equation 14)}$$

$$e = [y - y_d, \dot{y} - \dot{y}_d, \psi - \psi_d, \dot{\psi} - \dot{\psi}_d] = [e_1, \dot{e}_1, e_2, \dot{e}_2]^T, \quad \text{(Equation 15)}$$

$$A = \begin{bmatrix} 0 & 1 & 0 & 0 \\ 0 & -\frac{2C_{af} + 2C_{ar}}{mV_x} & \frac{2C_{af} + 2C_{ar}}{m} & \frac{(-2C_{af}l_f + 2C_{ar}l_r)}{(mV_x)} \\ 0 & 0 & 0 & 1 \\ 0 & -\frac{(2C_{af}l_f - 2C_{ar}l_r)}{(I_zV_x)} & \frac{(2C_{af}l_f - 2C_{ar}l_r)}{(I_z)} & -\frac{(2C_{af}l_f^2 - 2C_{ar}l_r^2)}{(I_zV_x)} \end{bmatrix}, \quad \text{(Equation 16)}$$

$$B_1 = \begin{bmatrix} 0 \\ \frac{2C_{af}}{m} \\ 0 \\ \frac{2C_{af}l_f}{I_z} \end{bmatrix}, \quad \text{(Equation 17)}$$

$$B_2 = \begin{bmatrix} 0 \\ -\frac{2C_{af}l_f - 2C_{ar}l_r}{mV_x} \\ 0 \\ -\frac{2C_{af}l_f^2 + 2C_{ar}l_r}{I_zV_x} \end{bmatrix}, \quad \text{(Equation 18)}$$

$$B_3 = \begin{bmatrix} 0 \\ -g \\ 0 \\ 0 \end{bmatrix}, \quad \text{(Equation 19)}$$

$$\dot{e} = Ae + B_1\delta + \begin{bmatrix} 0 \\ D1 \\ 0 \\ D2 \end{bmatrix} = Ae + B\begin{bmatrix} D1 \\ D2 \\ \delta \end{bmatrix}, \quad \text{(Equation 20)}$$

$$B = \begin{bmatrix} 0 & 0 & 0 \\ 1 & 0 & \frac{2C_{af}}{m} \\ 0 & 0 & 0 \\ 0 & 1 & \frac{2C_{af}l_f}{I_z} \end{bmatrix}, \quad \text{(Equation 21)}$$

$$D1 = \left(-\frac{2C_{af}l_f - 2C_{ar}l_f}{mV_x} - V_x\right)\dot{\psi}_{des} - g\sin(\phi), \quad \text{(Equation 22)}$$

$$D2 = \left(-\frac{2C_{af}l_f^2 + 2C_{ar}l_r^2}{I_zV_x}\right)\dot{\psi}_{des}, \quad \text{(Equation 23)}$$

$$\phi(x_k) = [\phi_k \quad \phi_{k+1} \quad \phi_{k+2} \quad \ldots \quad \phi_{k+p}], \text{ and} \quad \text{(Equation 24)}$$

$$\dot{\psi}_{des_h}(x_k) = [\dot{\psi}_{des_k} \quad \dot{\psi}_{des_{k+1}} \quad \dot{\psi}_{des_{k+2}} \quad \ldots \quad \dot{\psi}_{des_{k+p}}], \quad \text{(Equation 25)}$$

in which: (i) $e_1$ represents the lateral position error with respect to the road; (ii) $e_2$ represents the yaw angle error with respect to road; (iii) $\delta$ represents the front wheel steering angle; (iv) $\dot{\psi}_{k+i}$ represents the desired yaw rate point cloud over the prediction horizon considering curvature ($\dot{\psi}_{k+1} = \rho_{k+i}V_x$); and (v) $\phi_{k+i}$ represents the road bank angle point cloud over prediction horizon, and in which (i) the values of $\psi$ are represented in FIG. 7 and (ii) the values of $\phi$ are represented in FIG. 8 (in conjunction with the x-axis 520 and the y-axis 530 of FIG. 5). $C_{af}$, $C_{ar}$ are front and rear cornering coefficients, m is vehicle mass, $I_z$ is moment of inertia, $l_f$, $l_r$, are distance of center of gravity to front and rear axles, respectively, and $\delta$ is vehicle road wheel angle.

With continued reference to step 318, in various embodiments the lateral control is based on a processing of a number of inputs, including: (i) the desired trajectory $Y(x) = f(x)$ from the mission/path planner; (ii) vehicle path curvature ($\rho$); (iii) vehicle velocity ($v_x$, $v_y$); (iv) inertial measurement unit (IMU) data ($a_x$, $a_y$, $\omega_z$); (v) driver applied torque ($\tau_{driver}$); (vi) steering angle ($\delta$); (vii) enablement; (viii) driver override; (ix) safety critical ramp down request; (x) horizon bank angle $\phi$; and (xi) horizon desired curvature $\phi$. Also in various embodiments, these various inputs (e.g., obtained via the sensor array 120 of FIG. 1) are utilized by the processor 142 of FIG. 1 in generating a steering command for lateral control of the vehicle 100 based on the following equations:

$$\min_{\delta_0 \cdots \delta_n} \sum_{k \geq 0} g(e, \delta_t(e)), \quad \text{(Equation 26)}$$

such that:

$$\dot{e} = Ae + B_1\delta_t + B_2\dot{\psi}_{des} + B_3 \sin(\phi) + \tilde{e} \quad \text{(Equation 27) and}$$

$$\alpha_1 e + \alpha_2 \delta \leq c, \ \forall \tilde{e} \quad \text{(Equation 28),}$$

wherein: (i) $Ae + B_1\delta_t$ is a model based compensation of error dynamics; (ii) $B_2\psi_{des}$ is a desired curvature impact on error dynamics; (iii) $B_3 \sin(\phi)$ is the effect of bank angle (iv), $\tilde{e}$ represents uncertainties in the error dynamics (to be estimated and compensated), and (v) $\alpha_1 e + \alpha_2 \delta \leq c, \ \forall \tilde{e}$ represents a constraint for uncertainty realization and robust control and performance, feel, comfort, and safety constraints.

In addition, during step 320, in an exemplary embodiment, longitudinal control of the vehicle 100 is adjusted using a longitudinal trajectory tracking model for longitudinal compensation (via instructions provided by the processor 142 of FIG. 1) based on sensor data inputs provided by the sensor array 120 of FIG. 1, in conjunction with the following equations:

$$\dot{e}_x = v_x - v_{x_{ref}}, \quad \text{(Equation 29)}$$

$$\dot{v}_x = v_y\dot{\psi} + \frac{T_{B/E}}{mr} + g\sin(\theta)\cos(\phi), \quad \text{(Equation 30)}$$

$$\begin{bmatrix} \dot{e}_x \\ \ddot{e}_x \\ \dot{a}_{x_{actual}} \end{bmatrix} = \begin{bmatrix} 0 & 1 & 0 \\ 0 & 0 & 1 \\ 0 & 0 & -2\pi f \end{bmatrix} \begin{bmatrix} e_x \\ \dot{e}_x \\ a_{x_{actual}} \end{bmatrix} + \quad \text{(Equation 31)}$$

$$\begin{bmatrix} 0 \\ 0 \\ 2\pi f \end{bmatrix} [a_{x_{cmnd}}] + \begin{bmatrix} 0 \\ 1 \\ 0 \end{bmatrix} \left[-a_{x_{ref}} + g \cdot \cos(\phi) \cdot \theta\right],$$

$$\dot{x} = -Mx + N_1 a_{x_{cmnd}} + N_2\left(-a_{x_{ref}} + g \cdot \cos(\phi)\theta\right), \quad \text{(Equation 32)}$$

$$x = \begin{bmatrix} e_x \\ \dot{e}_x \\ a_{x_{actual}} \end{bmatrix}, \quad \text{(Equation 33)}$$

$$M = \begin{bmatrix} 0 & 1 & 0 \\ 0 & 0 & 1 \\ 0 & 0 & -2\pi f \end{bmatrix} \quad \text{(Equation 34)}$$

$$N_1 = \begin{bmatrix} 0 \\ 0 \\ 2\pi f \end{bmatrix}, \quad \text{(Equation 35)}$$

$$N_2 = \begin{bmatrix} 0 \\ 1 \\ 0 \end{bmatrix}, \quad \text{(Equation 36)}$$

$$g\theta(x_k) = g\cos(\phi)[\theta_k \ \theta_{k+1} \ \theta_{k+2} \ \ldots \ \theta_{k+p}], \text{ and} \quad \text{(Equation 37)}$$

$$a_{x_{ref}}(x_k) = \begin{bmatrix} a_{x_{ref_k}} & a_{x_{ref_{k+1}}} & a_{x_{ref_{k+2}}} & \ldots & a_{x_{ref_{k+p}}} \end{bmatrix}, \quad \text{(Equation 38)}$$

Figure 9:
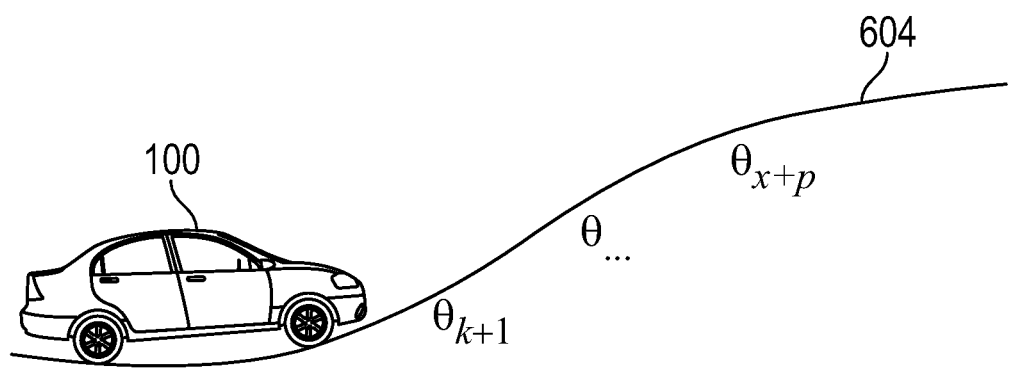

In which: (i) $T_{B/E}$ represents traction/brake torque; (ii) $a_x$ represents longitudinal acceleration; (ii) $v_x$ represents longitudinal velocity; (iii) $v_{x_{ref}}$ represents desired longitudinal velocity; (iv) $a_{x_{ref}}$ represents desired longitudinal acceleration; and (v) $\theta_{k+i}$ represents road grade angle point cloud over prediction horizon, and in which the values of the road grade angle $\theta$ are represented in FIG. 9. In various embodiments, acceleration and deceleration commands for longitudinal control of the vehicle can be generated similar to equations 26, 27 and 28.

In various embodiments, the method then terminates at step 322.

Accordingly, methods, systems, and vehicles are provided for controlling vehicles during road elevation transitions. In various embodiments, camera data and map data are utilized to generate a road grade angle and road bank angle profile along a receding prediction horizon along a roadway on which the vehicle is travelling. Also in various embodiments, a transformed version of the road grade angle and road bank angle profile are utilized to exercise lateral and longitudinal control over the vehicle, for example to help smooth transitions among sections of roadway with different road grade and/or road bank angles.

It will be appreciated that the systems, vehicles, and methods may vary from those depicted in the Figures and described herein. For example, the vehicle 100 of FIG. 1, the control system 102 of FIGS. 1 and 2, and/or components thereof of FIGS. 1 and 2 may vary in different embodiments. It will similarly be appreciated that the steps of the process 300 may differ from those depicted in FIG. 3, and/or that various steps of the process 300 may occur concurrently and/or in a different order than that depicted in FIG. 3. It will similarly be appreciated that the various implementations of FIGS. 4-9 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:
1. A method comprising:
   obtaining sensor data from one or more sensors onboard a vehicle, the sensor data including camera data from one or more cameras onboard the vehicle;
   obtaining location data pertaining to a location of the vehicle;
   receiving user inputs as to a destination of travel for the vehicle;
   obtaining map data pertaining to a path corresponding to the location and the destination of travel;
   generating, using a processor onboard the vehicle, a planned mission for travel to the destination along a roadway associated with the path, based on the user inputs, the location data, and the map data;
   generating, using the processor, a planned mission for travel to the destination along a roadway associated with the path, based on the user inputs and the location data;
   generating, using the processor, an elevation profile along the path using the sensor data, including the camera data, and the map data, by generating the road elevation profile over a receding prediction horizon for the roadway for a plurality of time points for travel of the vehicle along the roadway in accordance with the planned mission, using both the sensor data and the map data; and proactively controlling the vehicle, based on instructions provided by the processor, using the predicted elevation profile, for adjusting each of the following: acceleration, steering, and braking of the vehicle along the receding prediction horizon for the roadway for a plurality of time points for travel of the vehicle along the roadway in accordance with the planned mission, wherein the road elevation profile comprises a plurality of bank and grade angle data points that are obtained at different lanes and segments along the roadway, the bank and grade angle data points including: (i) first bank and grade angle data points along a first lane of the of the roadway in which the vehicle is currently travelling; (ii) second bank and grade angle data points corresponding to a second lane of the roadway comprising an immediately adjacent lane to the first lane; and (iii) third bank and grade angle data points along a third lane of the roadway that is two lanes away from the first lane.

2. The method of claim 1, further comprising:
performing, via the processor, a transformation of the elevation profile from road coordinates to vehicle coordinates, generating a transformed elevation profile.

3. The method of claim 2, wherein the step of controlling the vehicle comprises:
controlling lateral dynamics of the vehicle, via instructions provided by the processor, based on the transformed elevation profile, via an adjustment of the steering.

4. The method of claim 2, wherein the step of controlling the vehicle comprises:
controlling longitudinal dynamics of the vehicle, via instructions provided by the processor, based on the transformed elevation profile, via an adjustment of both the acceleration and the braking.

5. The method of claim 2, wherein the transformation comprises a rotation from the road coordinates to a desired path based on a road bank angle, a road grade angle, and a desired yaw angle.

6. The method of claim 2, wherein, the transformation is performed in accordance with the following equations:

$$\phi = \sin(e_{2d})\Theta + \cos(e_{2d})\Phi, \text{ and}$$

$$\theta = \cos(e_{2d})\Theta - \sin(e_{2d})\Phi,$$

in which $\Phi$ represents the road bank angle, $\Theta$ represents the road grade angle, and $e_{2d}$ represents the desired yaw angle for the desired path relative to the road path.

7. The method of claim 1, wherein:
each of the first data points include an associated road bank angle $\Phi^0 x$ and an associated road grade angle $\theta_0(x)$ for the first lane of the roadway;
each of the second data points include an associated road bank angle $\Phi^1 x$ and an associated road grade angle $\theta_1(x)$ for the second lane of the roadway; and
each of the third data points include an associated road bank angle $\Phi^2 x$ and an associated road grade angle $\theta_2(x)$ for the third lane of the roadway.

8. The method of claim 7, wherein the road elevation profile includes a road bank angle $\Phi$ for the roadway that is determined in accordance with the following equations:

$$y(x) = d_1 x + d_2 x^2 + d_3 x^3 + d_4 x^4 + d_5 x^5,$$

$$y_i(x) = c_0 + c_1 x + c_2 x^2 + c^3 x^3,$$

$$\Phi_i(x) = [\Phi_0^i, \ldots, \Phi_j^i, \ldots, \Phi_p^i], \text{ and}$$

For $0 \leq x_k \leq x_p$:

$$\operatorname*{argmin}_i \left( \sqrt{(y(x_k) - y_i(x_k))^2 + (y(x_k) - y_{i+1}(x_k))^2} \right)$$

$$\Phi(x_k) = \frac{\Phi_{i+1}(x_k) - \Phi_i(x_k)}{y_{i+1}(x_k) - y_i(x_k)} (y(x_k) - y_i(x_k)) + \Phi_i(x_k)$$

in which y is the lateral offset of the vehicle with respect to current position at look ahead distance x, $c_0, \ldots, c_3$ are polynomial coefficients for center of the lane for each lane i, $d_1, \ldots, d_5$ are polynomial coefficients for the planned mission profile to be determined over multiple lanes comprising the first lane, the second lane, and the third lane.

9. The method of claim 2, wherein the step of controlling the lateral dynamics of the vehicle comprises providing lateral control of the vehicle based on instructions provided by the processor based on a plurality of inputs that include: (i) a desired trajectory $Y(x) = f(x)$ from a mission planner; (ii) vehicle path curvature ($\rho$); (iii) vehicle velocity ($v_x$, $v_y$); (iv) inertial measurement unit (IMU) data ($a_x$, $a_y$, $\omega_z$); (v) driver applied torque ($\tau_{driver}$); (vi) steering angle ($\delta$); (vii) driver override; (viii) safety critical ramp down request; (ix) horizon bank angle $\phi$; and (x) horizon desired curvature $\dot{\phi}$.

10. The method of claim 3, wherein the step of controlling the longitudinal dynamics of the vehicle comprises providing longitudinal control of the vehicle based on instructions provided by the processor based on a longitudinal trajectory tracking model for longitudinal compensation based on sensor data inputs from the sensor data.

11. The method of claim 9, wherein the step of providing the lateral control of the vehicle is based on the following equations:

$$\min_{\delta_0 \ldots \delta_n} \sum_{t \geq 0} g(e, \delta_t(e))$$

such that:

$$\dot{e} = Ae + B_1 \delta_t + B_2 \dot{\psi}_{des} + B_3 \sin(\phi) + \tilde{e}, \text{ and}$$

$\alpha_1 e + \alpha_2 \delta \leq c$, $\forall \tilde{e}$, wherein: (i) $Ae + B_1 \delta_t$ is a model based compensation of error dynamics; (ii) $B_2 \dot{\psi}_{des}$ is a desired curvature impact on error dynamics; (iii) $B_3 \sin(\phi)$ is the effect of bank angle (iv), $\tilde{e}$ represents uncertainties in the error dynamics (to be estimated and compensated), and (v) $\alpha_1 e + \alpha_2 \delta \leq c$, $\forall \tilde{e}$ represents a constraint for uncertainty realization and robust control and performance, feel, comfort, and safety constraints.

12. The method of claim 10, wherein the step of providing the longitudinal control of the vehicle is based on the following equations:

$$\dot{e}_x = v_x - v_{x_{ref}},$$

$$\dot{v}_x = v_y \dot{\psi} + T_{B/E}/mr + g \sin(\theta)\cos(\phi),$$

$$\begin{bmatrix} \dot{e}_x \\ \ddot{e}_x \\ a_{x_{actual}} \end{bmatrix} = \begin{bmatrix} 0 & 1 & 0 \\ 0 & 0 & 1 \\ 0 & 0 & -2\pi f \end{bmatrix} \begin{bmatrix} e_x \\ \dot{e}_x \\ a_{x_{actual}} \end{bmatrix}$$

-continued $$+ \begin{bmatrix} 0 \\ 0 \\ 2\pi f \end{bmatrix} [a_{x_{cmnd}}] + \begin{bmatrix} 0 \\ 1 \\ 0 \end{bmatrix} [-a_{x_{ref}} + g \cdot \cos(\phi) \cdot \theta]$$

$$\dot{x} = -Mx + N_1 a_{x_{cmnd}} + N_2(-a_{x_{ref}} + g \cdot \cos(\phi)\theta),$$

$$x = \begin{bmatrix} \dot{e}_x \\ \ddot{e}_x \\ a_{x_{actual}} \end{bmatrix},$$

$$M = \begin{bmatrix} 0 & 1 & 0 \\ 0 & 0 & 1 \\ 0 & 0 & -2\pi f \end{bmatrix},$$

$$N_1 = \begin{bmatrix} 0 \\ 0 \\ 2\pi f \end{bmatrix},$$

$$N_2 = \begin{bmatrix} 0 \\ 1 \\ 0 \end{bmatrix},$$

$$g\theta(x_k) = g \cos(\phi)[\theta_k \theta_{k+1} \theta_{k+2} \ldots \theta_{k+p}], \text{ and}$$

$$a_{x_{ref}}(x_k) = \begin{bmatrix} a_{x_{ref_k}} & a_{x_{ref_{k+1}}} & a_{x_{ref_{k+2}}} & \cdots & a_{x_{ref_{k+p}}} \end{bmatrix}$$

in which (i) $T_{B/E}$ represents traction/brake torque; (ii) $a_x$ represents longitudinal acceleration; (ii) $v_x$ represents longitudinal velocity; (iii) $v_{x_{ref}}$ represents desired longitudinal velocity; (iv) $a_{x_{ref}}$ represents desired longitudinal acceleration; and (v) $\theta_{k+i}$ represents road grade angle point cloud over prediction horizon.

13. A system comprising:
one or more sensors configured to at least facilitate obtaining dynamic measurements and path information for a vehicle, including sensor data that includes camera data, and receiving user inputs as to a destination of travel for the vehicle;
one or more location systems configured to at least facilitate obtaining location data pertaining to a location of the vehicle;
a computer memory configured to store map data pertaining to a path corresponding to the location; and
a processor configured to at least facilitate:
generating a planned mission for travel to the destination along a roadway associated with the path, based on the user inputs, the location data, and the map data;
generating a planned mission for travel to the destination along a roadway associated with the path, based on the user inputs and the location data;
generating an elevation profile along the path using the sensor data and the map data, by generating the road elevation profile over a receding prediction horizon for the roadway for a plurality of time points for travel of the vehicle along the roadway in accordance with the planned mission, using both the sensor data, including the camera data, and the map data; and
providing instructions for controlling the vehicle using the elevation profile, for adjusting each of the following: acceleration, steering, and braking of the vehicle along the receding prediction horizon for the roadway for a plurality of time points for travel of the vehicle along the roadway in accordance with the planned mission,
wherein the road elevation profile comprises a plurality of bank and grade angle data points that are obtained at different lanes and segments along the roadway, the bank and grade angle data points including: (i) first bank and grade angle data points along a first lane of the of the roadway in which the vehicle is currently travelling; (ii) second bank and grade angle data points corresponding to a second lane of the roadway comprising an immediately adjacent lane to the first lane; and (iii) third bank and grade angle data points along a third lane of the roadway that is two lanes away from the first lane.

14. The system of claim 13, wherein the processor is configured to at least facilitate performing a transformation of the elevation profile from road coordinates to vehicle coordinates, generating a transformed elevation profile.

15. The system of claim 14, wherein the processor is further configured to at least facilitate:
controlling lateral movement of the vehicle based on the transformed elevation profile, via an adjustment of the steering; and
controlling longitudinal movement of the vehicle based on the transformed elevation profile, via an adjustment of both the acceleration and the braking.

16. The system of claim 14, wherein the transformation comprises a rotation from the road coordinates to a desired path based on a road bank angle, a road grade angle, and a desired yaw angle.

17. A vehicle comprising:
a body;
a propulsion system configured to generate movement of the body;
one or more sensors disposed onboard the vehicle and configured to at least facilitate obtaining sensor data for the vehicle, including camera data, and receiving user inputs as to a destination of travel for the vehicle;
one or more location systems configured to at least facilitate obtaining location data pertaining to a location of the vehicle;
a computer memory configured to store map data pertaining to a path corresponding to the location; and
a processor disposed onboard the vehicle and configured to at least facilitate:
generating a planned mission for travel to the destination along a roadway associated with the path, based on the user inputs, the location data, and the map data;
generating a planned mission for travel to the destination along a roadway associated with the path, based on the user inputs and the location data;
generating an elevation profile along the path using the sensor data, including the camera data, and the map data, by generating the road elevation profile over a receding prediction horizon for the roadway for a plurality of time points for travel of the vehicle along the roadway in accordance with the planned mission, using both the sensor data and the map data; and
providing instructions for controlling the vehicle using the elevation profile, for adjusting each of the following: acceleration, steering, and braking of the vehicle along the receding prediction horizon for the roadway for a plurality of time points for travel of the vehicle along the roadway in accordance with the planned mission,
wherein the road elevation profile comprises a plurality of bank and grade angle data points that are obtained at different lanes and segments along the roadway, the bank and grade angle data points including: (i) first bank and grade angle data points along a first lane of the of the roadway in which the vehicle is currently travelling; (ii) second bank and grade angle data points corresponding to a second lane of the roadway comprising an immediately adjacent lane to the first lane; and (iii) third bank and grade angle data points along a third lane of the roadway that is two lanes away from the first lane.

18. The vehicle of claim 17, wherein the processor is configured to at least facilitate performing a transformation of the elevation profile from road coordinates to vehicle coordinates, generating a transformed elevation profile.

19. The vehicle of claim 18, wherein the processor is further configured to at least facilitate controlling lateral movement and longitudinal movement of the vehicle based on the transformed elevation profile, via adjustments to each of the steering, the braking, and the acceleration.

20. The vehicle of claim 18, wherein the transformation comprises a rotation from the road coordinates to a desired path based on a road bank angle, a road grade angle, and a desired yaw angle.

\* \* \* \* \*